G. W. BUTLER & T. P. O'CONNELL.
STALK-PULLER.
No. 175,924.  Patented April 11, 1876.
Fig: 1.
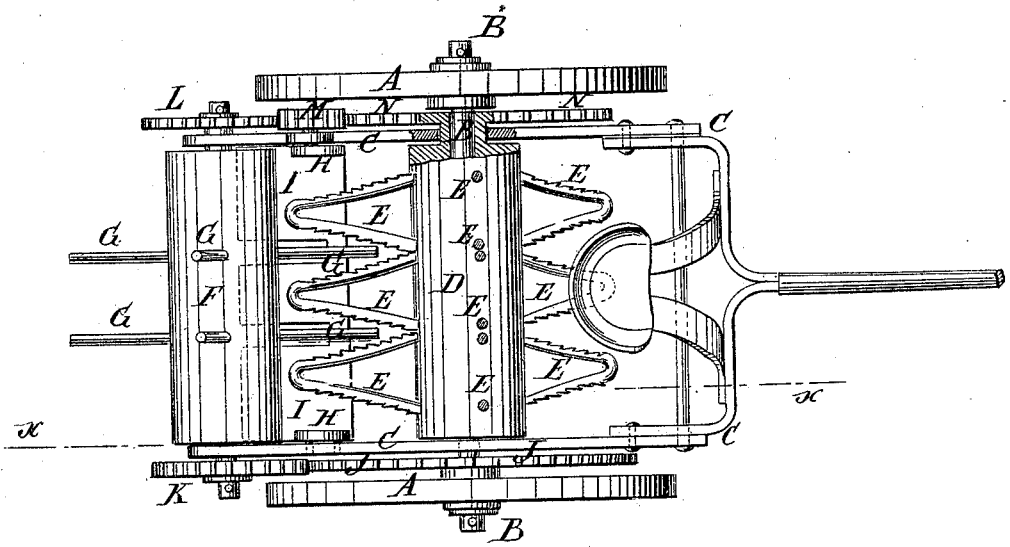
Fig: 2.
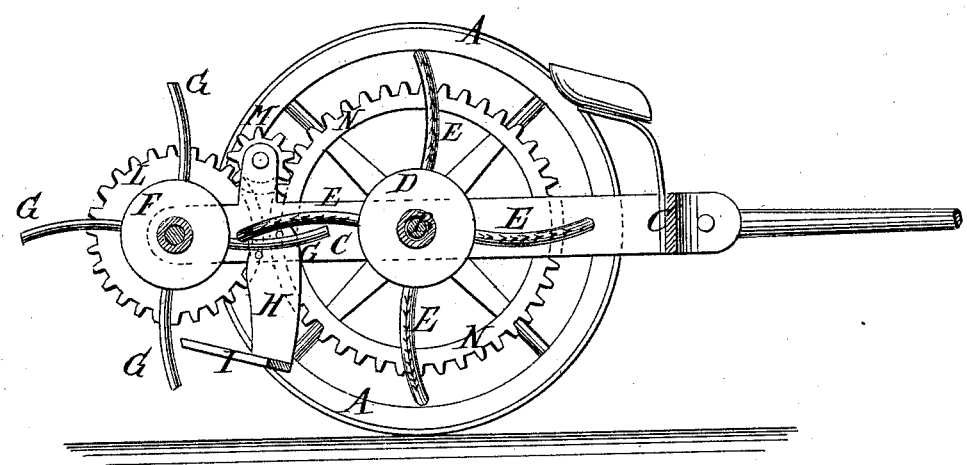
WITNESSES:
INVENTOR:
G. W. Butler and
BY T. P. O'Connell
ATTORNEYS

UNITED STATES PATENT OFFICE.

GEORGE W. BUTLER AND TIMOTHY P. O'CONNELL, OF SAN ANTONIO, TEXAS.

IMPROVEMENT IN STALK-PULLERS.

Specification forming part of Letters Patent No. 175,924, dated April 11, 1876; application filed February 14, 1876.

*To all whom it may concern:*

Be it known that we, GEORGE W. BUTLER and TIMOTHY P. O'CONNELL, of San Antonio, in the county of Bexar and State of Texas, have invented a new and useful Improvement in Stalk-Puller, of which the following is a specification:

Figure 1 is a top view of our improved machine, the top row of bearded teeth being shown in section. Fig. 2 is a longitudinal section of the same, taken through the line $x\,x$, Fig. 1.

Similar letters of reference indicate corresponding parts.

The object of this invention is to furnish an improved machine designed especially for pulling cotton-stalks, but which may be used with advantage for pulling other stalks, weeds, &c., and which shall be so constructed as to clear itself of the stalks as they are pulled. The invention consists in the combination of the cylinder provided with the curved and bearded V-teeth, the cylinder provided with the curved teeth, the slotted plate, and a suitable connecting-gearing, with the frame, the axle, and the drive-wheels, as hereinafter fully described.

A are the wheels which revolve upon the journals of the axle B. The axle B revolves in bearings attached to the side bars of the frame C, and to it is attached a cylinder, D, so that the said axle and cylinder may revolve together. To the cylinder D are attached rows of V-shaped teeth E, which are curved forward, are bearded upon their side edges, and may be made of wire bent into V form, or solid, as may be desired. As the cylinder D is revolved the teeth E take hold of the stalks, pull them, and carry them over the said cylinder. In bearings in the rear ends of the side bars of the frame C revolve the journals of a cylinder, F, to which are attached rows of curved teeth G, in such positions as to pass up between the teeth E of the cylinder D, to detach the stalks from said teeth, carry them over the said cylinder F, and drop them to the ground. To the rear part of the side bars of the frame C are attached the ends of two arms, H, which project downward, and to their lower ends are attached the ends of a plate, I. The plate I is made wide, and has slots formed in it, leading in from its rear edge, and in such positions that the teeth G of the cylinder F may pass through them as the said cylinder revolves. The slotted plate I is intended to remove from the teeth G any stalks that may adhere to them, to keep the said teeth always clear.

To one of the drive-wheels A is attached a large gear-wheel, J, the teeth of which mesh into the teeth of a smaller gear-wheel, K, attached to one of the journals of the cylinder F. To the other journal of the cylinder F, is attached a gear-wheel, L, the teeth of which mesh into the teeth of a small intermediate gear-wheel, M, pivoted to the frame C, or to a stud attached to said frame. The teeth of the gear-wheel M mesh into the teeth of a large gear-wheel, N, attached to the axle B, or cylinder D, so that the cylinder D may be revolved in the opposite direction from the drive-wheels A. The cylinders D F may be revolved by chain-wheels and chains, if desired.

To the forward end of the frame C is attached a tongue, O; to which the draft is applied.

Having thus described our invention, we claim as new and desire to secure by Letters Patent—

The combination of the cylinder D, provided with the curved and bearded ⊔-teeth E, the cylinder F, provided with the curved teeth G, the slotted plate I, and a suitable connecting-gearing, with the frame C, the axle B, and the wheels A, substantially as herein shown and described.

GEORGE W. BUTLER.
TIMOTHY P. O'CONNELL.

Witnesses:
J. S. RAMSAY,
GEO. W. BAYLOR.